(12) United States Patent
Bhatnagar et al.

(10) Patent No.: US 11,899,544 B2
(45) Date of Patent: Feb. 13, 2024

(54) EFFICIENT SYNCHRONIZATION OF CLOUD ENABLED FILE SYSTEM DATABASE DURING SNAPSHOT RESTORE OPERATION

(71) Applicant: EMC IP Holding Company LLC, Hopkinton, MA (US)

(72) Inventors: Anurag Bhatnagar, Bangalore (IN); Priyamrita Ghosh, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 291 days.

(21) Appl. No.: 16/878,256

(22) Filed: May 19, 2020

(65) Prior Publication Data

US 2021/0365329 A1   Nov. 25, 2021

(51) Int. Cl.
*G06F 11/14* (2006.01)
*G06F 16/11* (2019.01)
(Continued)

(52) U.S. Cl.
CPC ...... *G06F 11/1469* (2013.01); *G06F 11/1464* (2013.01); *G06F 16/128* (2019.01);
(Continued)

(58) Field of Classification Search
CPC .. G06F 11/1469; G06F 16/162; G06F 16/178; G06F 16/128; G06F 11/1464; G06F 2201/84

See application file for complete search history.

(56) References Cited

U.S. PATENT DOCUMENTS 7,107,292 B1 *   9/2006   Hrle ..................... G06F 11/1469
                                                        707/999.104
8,738,571 B1 *   5/2014   Abdulla ................ G06F 16/162
                                                        707/626

(Continued)

OTHER PUBLICATIONS

Dell Inc., Dell EMC Unity: Cloud Tiering Appliance (CTA), available at https://www.dellemc.com/fr-mg/collaterals/unauth/white-papers/solutions/h16376-dell-emc-unity-cloud-tiering-appliance.pdf, Mar. 2019.

*Primary Examiner* — Pierre M Vital
*Assistant Examiner* — Jedidiah P Ferrer
(74) *Attorney, Agent, or Firm* — Ryan, Mason & Lewis, LLP (57) ABSTRACT

Methods, apparatus, and processor-readable storage media for efficient synchronization of a cloud enabled file system database during a snapshot restore operation are provided herein. An example computer-implemented method includes intercepting a user request to initiate a snapshot restore operation on a file system associated with a local storage system, wherein the file system comprises one or more stub files that are indicative of locations of cloud objects comprising files that were previously sent from the local storage system to a cloud storage platform; prior to the snapshot restore operation being performed, creating a current snapshot of the file system; obtaining an indication that the file system was successfully restored on the local storage system; and using the current snapshot to perform a synchronization operation, wherein the synchronization operation deletes one or more orphan cloud objects in the cloud storage platform that resulted from the snapshot restore operation.

20 Claims, 8 Drawing Sheets

(51) Int. Cl.
*G06F 16/178* (2019.01)
*G06F 16/16* (2019.01)

(52) U.S. Cl.
CPC .......... *G06F 16/162* (2019.01); *G06F 16/178* (2019.01); *G06F 2201/84* (2013.01)

(56) References Cited

U.S. PATENT DOCUMENTS

| | | | |
|---|---|---|---|
| 2005/0015409 A1* | 1/2005 | Cheng | G06F 16/10 |
| | | | 707/999.2 |
| 2010/0088271 A1* | 4/2010 | Brixius | G06F 16/185 |
| | | | 707/E17.01 |
| 2012/0150799 A1* | 6/2012 | Matsuzawa | G06F 16/178 |
| | | | 707/622 |
| 2015/0310080 A1* | 10/2015 | Jaquette | G06F 16/11 |
| | | | 707/639 |
| 2016/0352827 A1* | 12/2016 | Procopio | G06F 11/1461 |
| 2018/0284986 A1* | 10/2018 | Bhagi | G06F 11/1464 |
| 2019/0213089 A1* | 7/2019 | Podge | G06F 16/2246 |
| 2020/0073802 A1* | 3/2020 | Pradhan | G06F 11/1435 |
| 2021/0037112 A1* | 2/2021 | Ankireddypalle | H04L 67/565 |

\* cited by examiner

EFFICIENT SYNCHRONIZATION OF CLOUD ENABLED FILE SYSTEM DATABASE DURING SNAPSHOT RESTORE OPERATION

FIELD

The field relates generally to information processing systems, and more particularly to storage in such systems.

BACKGROUND

Data storage systems, such as those utilized in network-attached storage (NAS) platforms, allow large sets of data to be maintained in an efficient and reliable way. Data stored in such storage systems can be transferred to cloud object storage based on a user defined policy using, for example, software running on the data storage system.

A need exists for improved cloud object management techniques.

SUMMARY

Illustrative embodiments of the disclosure provide techniques for efficient synchronization of a cloud enabled file system database during a snapshot restore operation. An exemplary computer-implemented method includes intercepting a user request to initiate a snapshot restore operation on a file system associated with a local storage system, wherein the file system comprises one or more stub files that are indicative of locations of cloud objects comprising files that were previously sent from the local storage system to a cloud storage platform; prior to the snapshot restore operation being performed, creating a current snapshot of the file system; obtaining an indication that the file system was successfully restored on the local storage system; and using the current snapshot to perform a synchronization operation, wherein the synchronization operation deletes one or more orphan cloud objects in the cloud storage platform that resulted from the snapshot restore operation.

Illustrative embodiments can provide significant advantages relative to conventional storage management techniques. For example, challenges associated with orphan archived files resulting from a snapshot restore operation are overcome in one or more embodiments through a synchronization process during the snapshot restoration operation that efficiently handles such orphan archived files.

These and other illustrative embodiments described herein include, without limitation, methods, apparatus, systems, and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Typically, when a local storage system transfers a file to cloud object storage, a local stub file (having an approximate size of 8 kilobytes, for example) is created on the local data storage system along with an additional link entry in a file system stub database, which acts as a pointer to a cloud address where data corresponding to the file is stored.

In a situation where the local data storage system includes one or more stub files and a user initiates a snapshot restoration on a cloud enabled file system, the restoration operation may switch the state of the file system back to a point in time when one or more of the stub files were not yet created. In these situations, orphan cloud objects can remain on the cloud object storage. The term "orphan cloud object" as used herein is intended to be broadly construed, and generally refers to a cloud object allocated to an address space without a pointer pointing to it (e.g., a cloud object without a corresponding stub file pointing to it).

Figure 1:
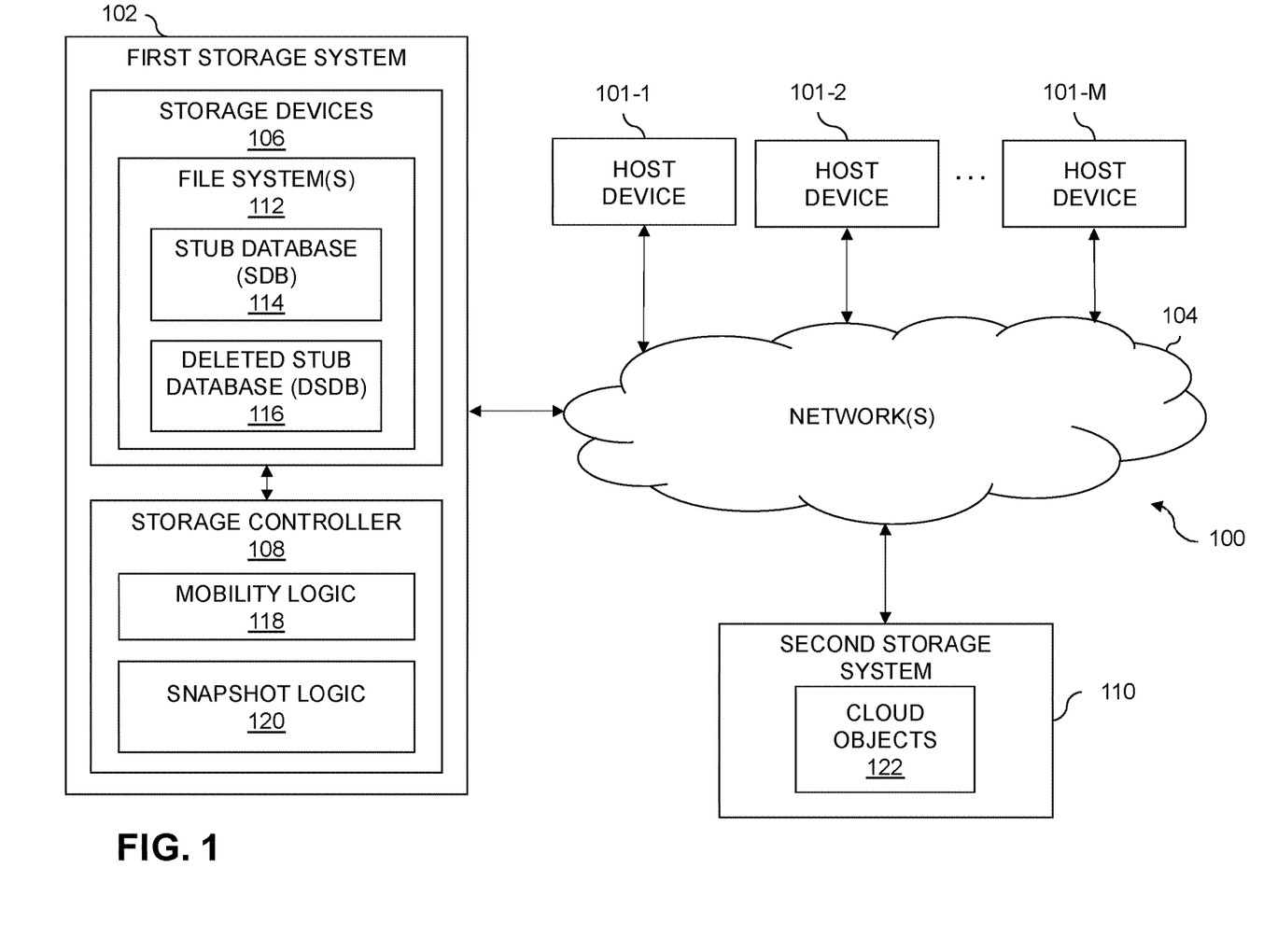
FIG. 1 shows an information processing system configured for efficient synchronization of a cloud enabled file system database during a snapshot restore operation in an illustrative embodiment.

FIG. 1 shows an information processing system 100 configured in accordance with an illustrative embodiment. The information processing system 100 comprises a plurality of host devices 101-1, 101-2, . . . 101-M, collectively referred to herein as host devices 101, and a first storage system 102. The host devices 101 are configured to communicate with the first storage system 102 over a network 104. Also, shown in FIG. 1 is a second storage system 110, which in at least some embodiments corresponds to a cloud storage system that, optionally, stores cloud objects 122.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate input-output (IO) operations that are processed by the first storage system 102. The term "input-output" as used herein refers to at least one of input and output. For example, IO operations may comprise write requests and/or read requests directed to logical addresses of a particular logical storage volume of the first storage system 102. These and other types of IO operations are also generally referred to herein as IO requests.

The first storage system 102 illustratively comprises processing devices of one or more processing platforms. For example, the first storage system 102 can comprise one or more processing devices each having a processor and a memory, possibly implementing virtual machines and/or containers, although numerous other configurations are possible.

The first storage system 102 can additionally or alternatively be part of a cloud infrastructure such as an Amazon Web Services (AWS) system. Other examples of cloud-based systems that can be used to provide at least portions of the first storage system 102 include Google Cloud Platform (GCP) and Microsoft Azure.

The host devices 101 and the first storage system 102 may be implemented on a common processing platform, or on separate processing platforms. The host devices 101 are illustratively configured to write data to and read data from the first storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The first storage system 102 comprises a plurality of storage devices 106 and an associated storage controller 108. The storage devices 106 store data of a plurality of storage volumes. For example, the storage volumes may illustratively comprise respective logical units (LUNs) or other types of logical storage volumes. The term "storage volume" as used herein is intended to be broadly construed, and should not be viewed as being limited to any particular format or configuration.

The storage devices 106 of the first storage system 102 illustratively comprise solid state drives (SSDs). Such SSDs are implemented using non-volatile memory (NVM) devices such as flash memory. Other types of NVM devices that can be used to implement at least a portion of the storage devices 106 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the first storage system 102.

It is therefore to be appreciated numerous different types of storage devices 106 can be used in first storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In the FIG. 1 embodiment, the first storage system 102 includes at least one file system 112. In some exemplary embodiments, one or more of the host devices 101 may also include at least one file system. The term "file system" as used herein is intended to be broadly construed, and is not intended to be limited to any particular device or configuration. As depicted in FIG. 1, the at least one file system 112 may include a stub database (SDB) 114 and a deleted stub database (DSDB) 116. According to exemplary embodiments, the stub database 114 and the DSDB 116 are maintained to enable integration of the file system 112 with the second storage system 110, thereby allowing the file system 112 to be cloud-enabled, as described in more detail herein. In at least one example embodiment, the SDB 114 and the DSDB 116 may be implemented as hidden directories within the file system 112.

The SDB 114 includes data pertaining to hard links of stubbed files of the file system 112. Generally, once a file has been sent from the first storage system 102 to the second storage system 110, a stub file is created in the SDB 114 that acts as pointer to a cloud address of one of the cloud objects 122 that stores the data of the file. The DSDB 116 is used for holding hard links of deleted stubbed files or rehydrated stubbed files. The SDB 114 and the DSDB 116 may be maintained at least in part by mobility logic 118 of storage controller 108 as described in more detail elsewhere herein.

In some embodiments, the first storage system 102 illustratively comprises a scale-out all-flash distributed content addressable storage (CAS) system, such as an XtremIO™ storage array from Dell EMC of Hopkinton, Massachusetts A wide variety of other types of distributed or non-distributed storage arrays can be used in implementing the first storage system 102 in other embodiments, including by way of example one or more VNX®, VMAX®, Unity™ or PowerMax™ storage arrays, commercially available from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as NAS, storage area networks (SANs), direct-attached storage (DAS) and distributed DAS, as well as combinations of these and other storage types, including software-defined storage.

In some embodiments, communications between the host devices 101 and the first storage system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the first storage system 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The host devices 101 are configured to interact over the network 104 with the first storage system 102. Such interaction illustratively includes generating IO operations, such as write and read requests, and sending such requests over the network 104 for processing by the first storage system 102. In some embodiments, each of the host devices 101 comprises a multi-path input-output (MPIO) driver configured to control delivery of IO operations from the host device to the first storage system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the first storage system 102.

The MPIO driver may comprise, for example, an otherwise conventional MPIO driver, such as a PowerPath® driver from Dell EMC. Other types of MPIO drivers from other driver vendors may be used.

The storage controller 108 of first storage system 102 in the FIG. 1 embodiment includes mobility logic 118 and snapshot logic 120. Functionality for efficient synchronization of a cloud enabled file system database during snapshot restore operation in the first storage system 102 is illustratively performed at least in part by the storage controller 108, utilizing its mobility logic 118 and/or its snapshot logic 120, in a manner to be described in more detail elsewhere herein.

The storage controller 108 and the first storage system 102 may further include one or more additional modules and other components typically found in conventional implementations of storage controllers and storage systems, although such additional modules and other components are omitted from the figure for clarity and simplicity of illustration.

The first storage system 102 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the first storage system 102 in such an embodiment collectively comprise at least a portion of the storage controller 108 of the first storage system 102. For example, in some embodiments the sets of processing modules of the storage nodes collectively comprise a distributed storage controller of the distributed first storage system 102. A "distributed storage system" as that term is broadly used herein is intended to encompass any storage system that, like the first storage system 102, is distributed across multiple storage nodes.

It is assumed in some embodiments that the processing modules of a distributed implementation of storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the distributed storage controller using well-known communication protocols such as TCP/IP and remote direct memory access (RDMA). For example, respective sets of IP links used in data transfer and corresponding messaging could be associated with respective different ones of the routing modules.

Each storage node of a distributed implementation of first storage system 102 illustratively comprises a CPU or other type of processor, a memory, a network interface card (NIC) or other type of network interface, and a subset of the storage devices 106, possibly arranged as part of a disk array enclosure (DAE) of the storage node. These and other references to "disks" herein are intended to refer generally to storage devices, including SSDs, and should therefore not be viewed as limited to spinning magnetic media.

The first storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the first storage system 102 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the first storage system 102 to reside in different data centers. Numerous other distributed implementations of the host devices and the first storage system 102 are possible.

In some example embodiments, the second storage system 110 may correspond to a cloud storage system and may be implemented in a similar manner as the first storage system 102. For example, in at least one example embodiment, the first storage system 102 may relate to a local storage system (such as, for example, a NAS storage system), and the second storage system 110 may relate to one or more cloud storage systems (such as, for example, storage systems corresponding to Elastic Cloud Storage (ECS), GCP, AWS, and Microsoft Azure).

Additional examples of processing platforms utilized to implement host devices 101, first storage system 102, and second storage system 110 in illustrative embodiments will be described in more detail below in conjunction with FIGS. 7 and 8.

It is to be appreciated that these and other features of illustrative embodiments are presented by way of example only, and should not be construed as limiting in any way.

Accordingly, different numbers, types and arrangements of system components such as host devices 101, first storage system 102, network 104, storage devices 106, storage controller 108, second storage system 110, mobility logic 118, and snapshot logic 120 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

An exemplary process utilizing application mobility logic 118 and snapshot logic 120 will be described in more detail with reference to the flow diagram of FIG. 6.

As noted above, files on a file system of a local storage array (corresponding to the first storage system 102, for example) are transferred to cloud object storage (e.g., the second storage system 110) based on one or more user defined policies via virtualization software running on the local storage array platform. The virtualization software (also referred to herein as "mobility software") may be implemented at least in part by mobility logic 118. The local storage array may access these cloud files through the mobility software. The mobility software includes functionality to rehydrate any of the files back to the local storage array platform's file storage through a copy mechanism. The term "rehydrate" as used herein generally refers to any operation which reverses the process that is performed when transferring a file to cloud object storage, such as, for example, an operation which reconstitutes a file on the local storage system based on corresponding data in cloud object storage.

When a file is sent to cloud object storage, a local stub file is created on the file system of the local array, acting as a pointer to a cloud address of the cloud object storage.

Additionally, the local storage array may be configured to capture snapshots of the file system, for example, on a periodic basis or in response to an event such as, for example, a user request. As such, the file system may be associated with a plurality of different snapshots, wherein each of the snapshots is associated with a time the snapshot was created. The file system may be restored to the creation time corresponding to one of these snapshots by performing a snapshot restore operation.

Figure 2:
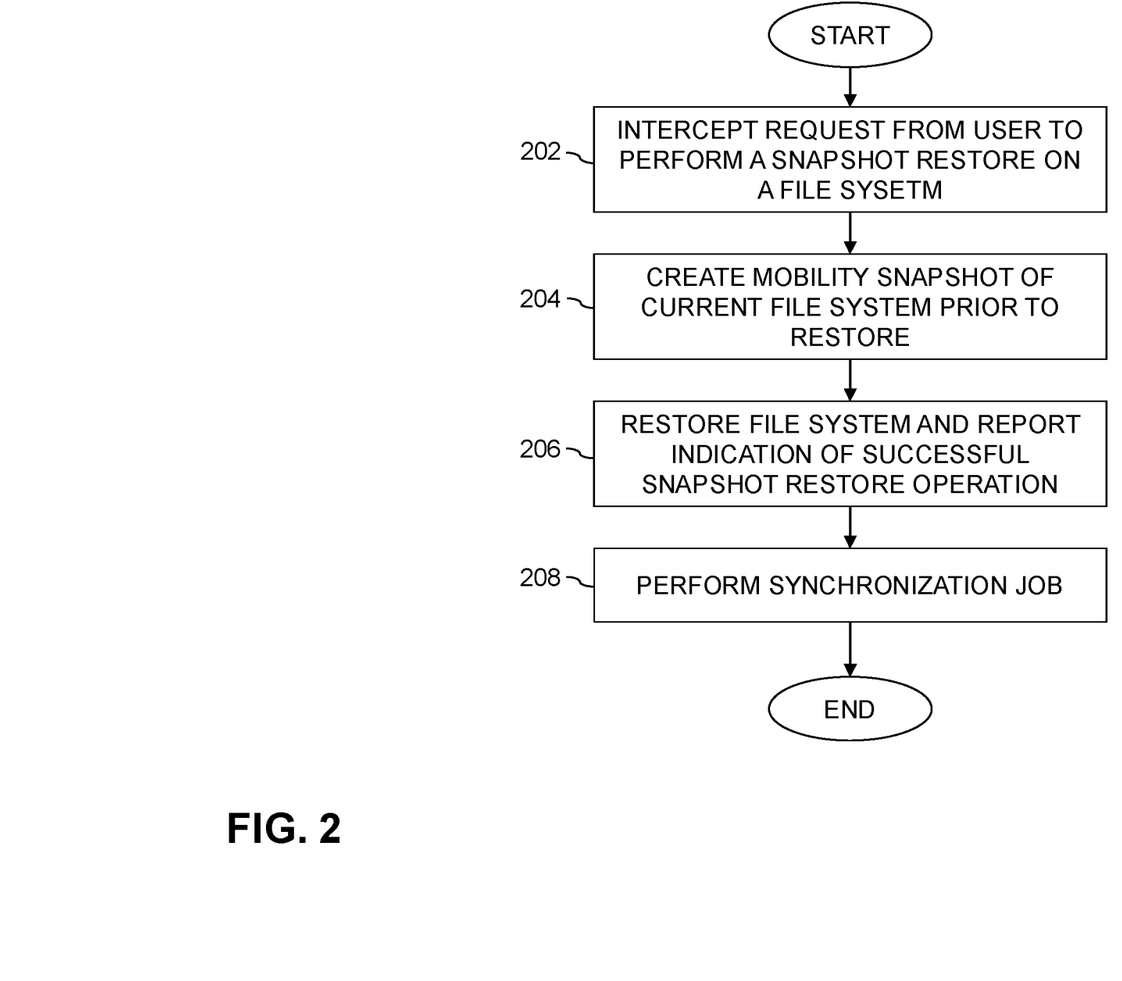
FIG. 2 shows an example of a snapshot restore operation in an illustrative embodiment.

FIG. 2 shows an example of a snapshot restore operation in an illustrative embodiment. It is to be appreciated that the snapshot restore operation in FIG. 2 may be viewed as a snapshot restore algorithm which may be executed, at least in part, by or under the control of at least one processing system and/or storage system. For example, the snapshot restore operation may be implemented as a portion of a software implementation of at least part of storage controller 108 of the FIG. 1 embodiment.

Step 202 includes intercepting a request from a storage array user to perform a snapshot restore on a file system. For example, the request may identify a particular snapshot that the file system is to be restored to. Step 204 includes creating a mobility snapshot (e.g., internal snapshot) of the file system before the file system is restored. Step 206 includes restoring the file system based on the snapshot in the request and reporting an indication that the snapshot restore operation was successful. Step 208 occurs after the file system is restored and includes performing a synchronization job. The synchronization job may, for example, correspond to one of the synchronization operations described in more detail below in conjunction with FIGS. 3-5. In one example embodiment, the storage array may send a REST API to the mobility software for creating the synchronization job. Additionally, in some example embodiments, the synchronization job may include deleting the mobility snapshot following the synchronization process.

Figure 3:
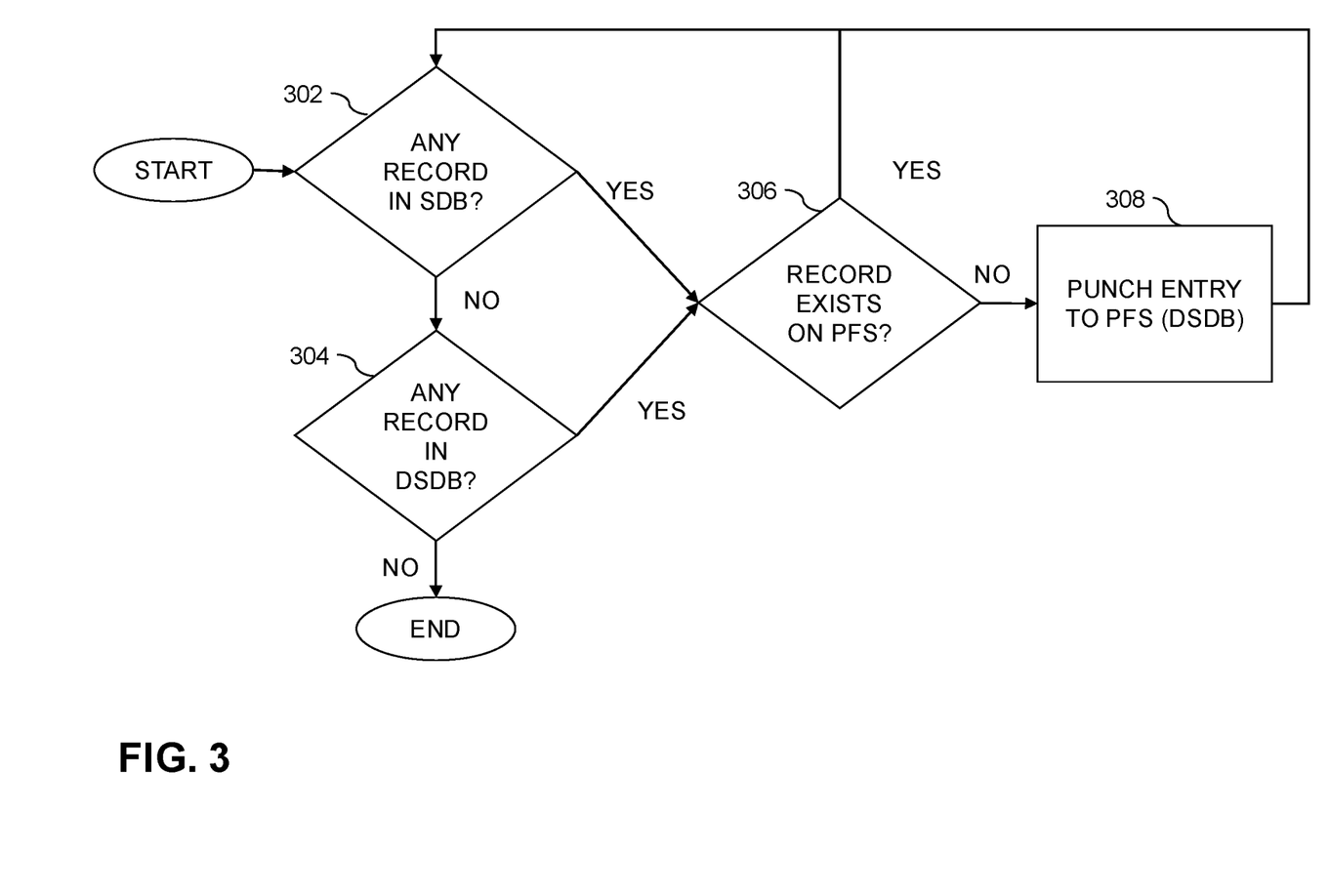
FIG. 3 shows a first example of a synchronization process in an illustrative embodiment.
Figure 4:
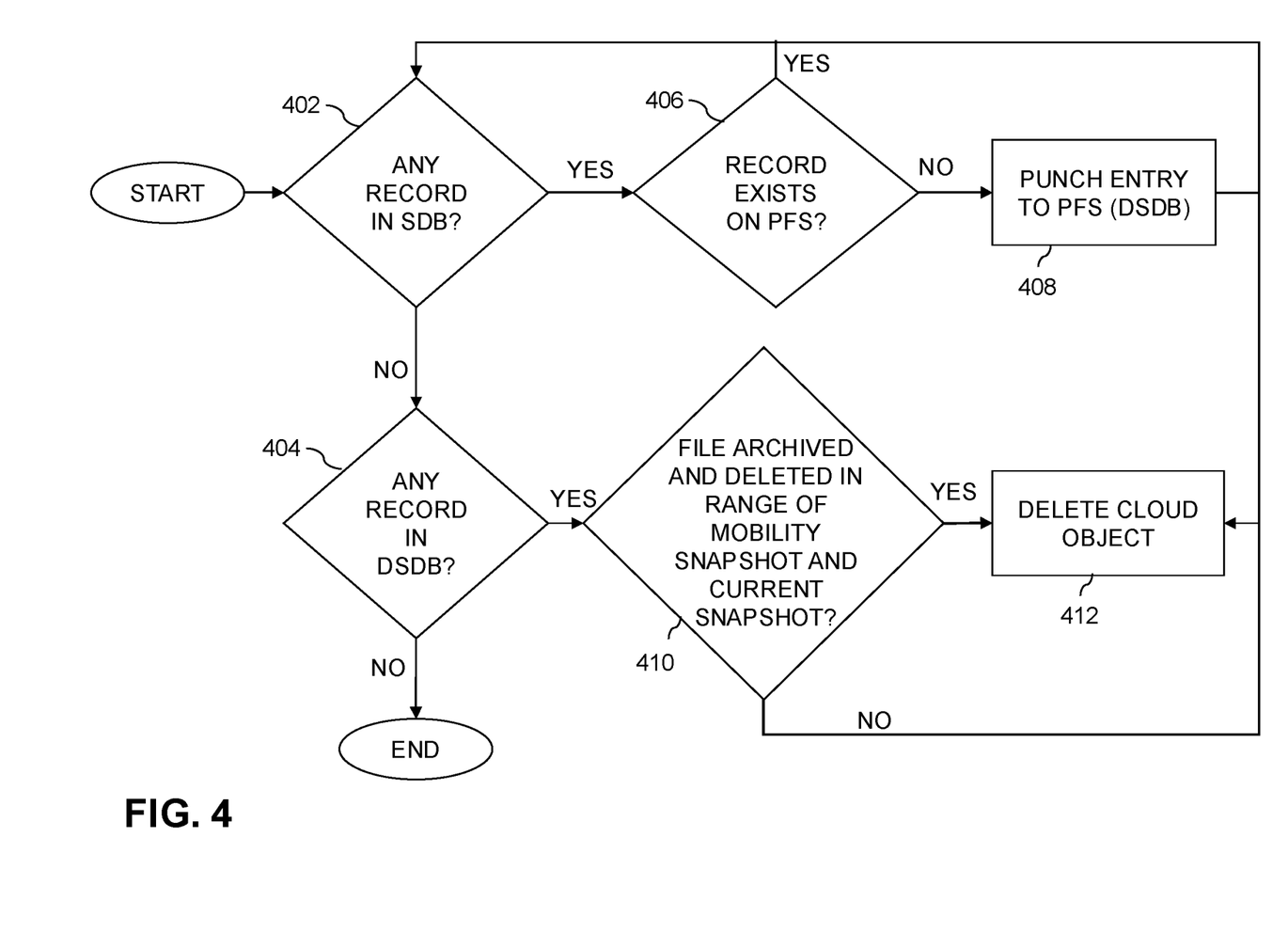
FIG. 4 shows a second example of a synchronization process in an illustrative embodiment.
Figure 5:
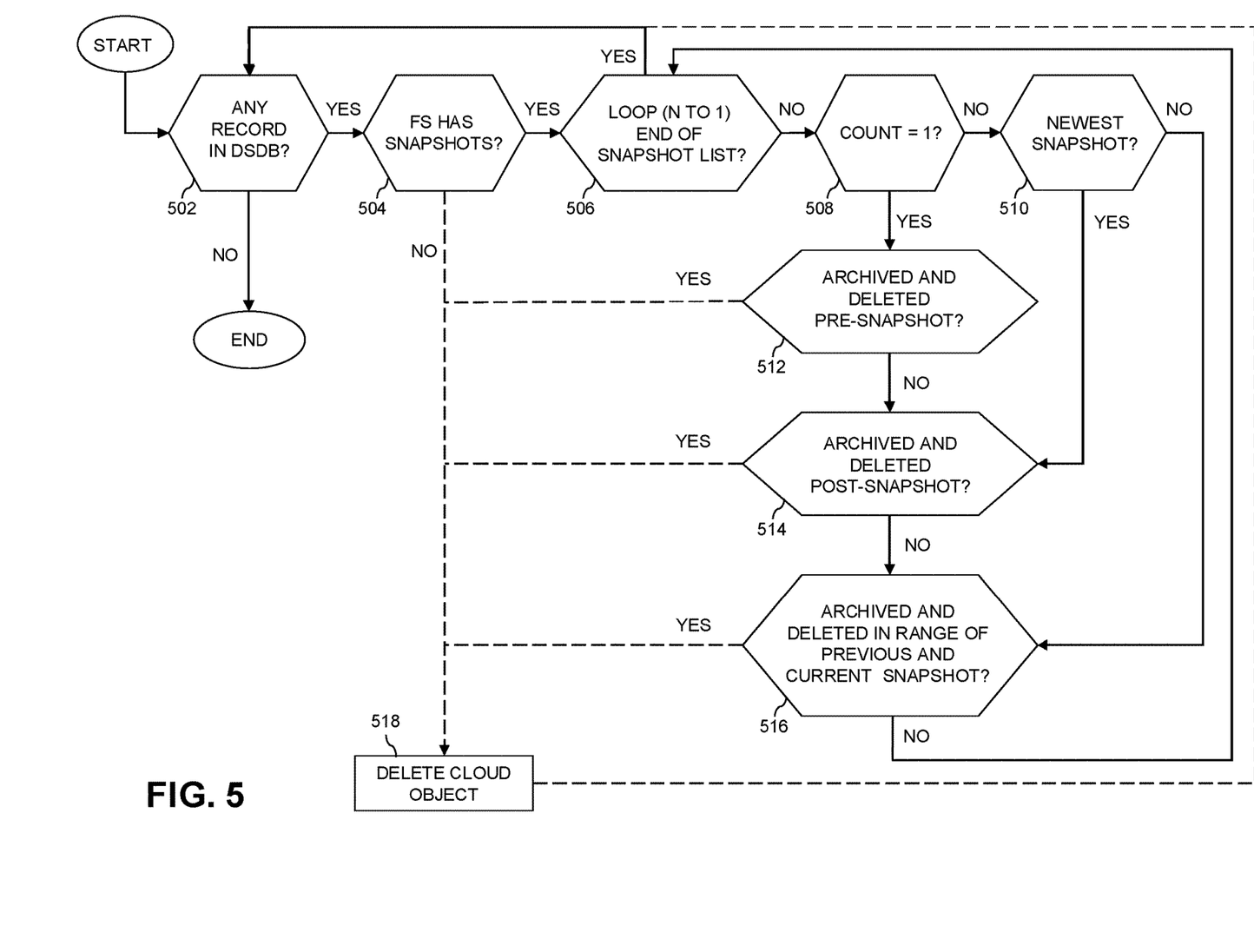
FIG. 5 shows a third example of a synchronization process in an illustrative embodiment.

FIGS. 3-5 show three examples of synchronization operations in illustrative embodiments. It is to be appreciated that the synchronization processes in FIGS. 3-5 may be viewed as synchronization algorithms which may be executed, at least in part, by or under the control of at least one processing system and/or storage system. For example, the synchronization operations may be implemented as a portion of a software implementation of at least part of storage controller 108 of the FIG. 1 embodiment.

FIG. 3 shows a first example of a synchronization process in an illustrative embodiment. Generally, the process in FIG. 3 may be characterized as punching (i.e., inserting) all entries from the SDB and the DSDB to the file system regardless of whether the records correspond to files that were created and deleted between the time of the mobility snapshot and the time of the snapshot that was used to restore the primary file system (PFS).

Step 302 includes checking whether any record exists in the SDB. If a record exists in the SDB, then the process continues to step 306, which includes checking whether the record from the SDB also exists on the PFS. If the record also exists on the PFS, then the process returns to step 302 to check whether there are any other records in the SDB.

If the record does not exist in the PFS at step 306, then step 308 is performed, which includes punching the record to the DSDB of the PFS. The process then returns to step 302 to process further records in the SDB, if any such records exist.

If there are no records in the SDB at step 302, then the process continues to step 304, which includes checking whether any records are in the DSDB. If there is a record in the DSDB, then the process continues to step 306, which is performed in a similar manner as described above. If no record exists in the DSDB, then the process ends.

The synchronization process in the FIG. 3 embodiment provides a relatively straightforward algorithm, wherein no operations in the cloud are needed. However, when a restore operation is performed, a large number of records (e.g., millions or more) may be transferred to the PFS. Also, the files created and deleted in a time range between the mobility snapshot and the snapshot used to restore the file system will not be cleaned up until the next scheduled orphan management operation. An orphan management operation may not be performed for some time (e.g., 30 or more days). It is also noted that multiple cloud delete requests might be sent for the same record, thereby leading to increased resources costs.

FIG. 4 shows a second example of a synchronization process in an illustrative embodiment. The process in FIG. 4 is more selective in which files are punched to the file system relative to the process in the FIG. 3 embodiment. Steps 402-408 are performed in a similar manner as described above with respect to steps 302-308 of FIG. 3.

Step 410 includes checking whether the file corresponding to the record in the DSDB was archived and deleted between the time of the mobility snapshot and the time of the snapshot used to restore the primary file system. If the file was archived and deleted at step 410, then the process continues to step 412, which includes deleting the cloud object corresponding to the record in the DSDB from the cloud storage platform. If the file was archived and deleted at step 410, then the process returns to step 402.

The synchronization process in the FIG. 4 embodiment accounts for files that were archived and deleted between the time of the mobility snapshot and the time of the snapshot that was used to restore the PFS. Additionally, it is noted that the process in FIG. 4 does not require files that were archived prior to the PFS state to be punched to the PFS (which can significantly reduce the number of files transferred to the PFS). As such, the synchronization process in the FIG. 4 embodiment may immediately clean up orphan objects resulting from the snapshot restore operation for files that were archived and deleted between the time of the snapshot used to restore the file system and the time of the mobility snapshot. A large number of records may still be transferred to the PFS in such a synchronization process and the process requires the cloud to perform the deletion operation.

FIG. 5 shows a third example of a synchronization process in an illustrative embodiment. The synchronization process in FIG. 5 can clean up orphan cloud objects resulting from a snapshot restore operation for a larger number of files using, for example, a list of available snapshots of the file system. Step 502 of FIG. 5 includes checking whether at least one record exists in the DSDB. If no record exists, then the process ends; otherwise, the process continues to step 504.

Step 504 includes determining whether any snapshots have been saved for the file system. If no, then the cloud object corresponding to the record is deleted at step 518. If there is a number, N, of existing snapshots, then step 506 includes looping through steps 508-518 for each of the N snapshots, beginning with the newest snapshot to the oldest snapshot.

Step 508 includes checking whether the current snapshot in the loop is the oldest snapshot (i.e., Snapshot 1). If the result of step 508 is yes, then the process continues to step 512.

Step 512 includes checking whether the file corresponding to the record in the DSDB was archived and deleted pre-snapshot (e.g., at some point in time before the current snapshot). If the result of step 512 is yes, then the corresponding cloud object is deleted at step 518. Otherwise, the process continues to step 514.

Step 514 includes checking whether the file was archived and deleted post-snapshot (e.g., at some point in time after the time of the current snapshot). If the result of step 514 is yes, then the corresponding cloud object is deleted at step 518. Otherwise, the process continues to step 516.

Step 516 includes checking whether the file was archived and deleted between the time of the current snapshot and the time of the previous snapshot in the list. If yes, then the corresponding cloud object is deleted at step 518. Otherwise, the process returns to step 506 to perform steps 508-518 with the next snapshot in the list.

If the result of step 508 is no (i.e., the current snapshot is not the oldest snapshot), then the process continues to step 510, which checks whether the current snapshot is the newest snapshot. If the snapshot is the newest snapshot, then the process continues to step 514; otherwise, the process continues to step 516. The process then continues in a similar manner as described above, until no records are left in the DSDB.

Figure 6:
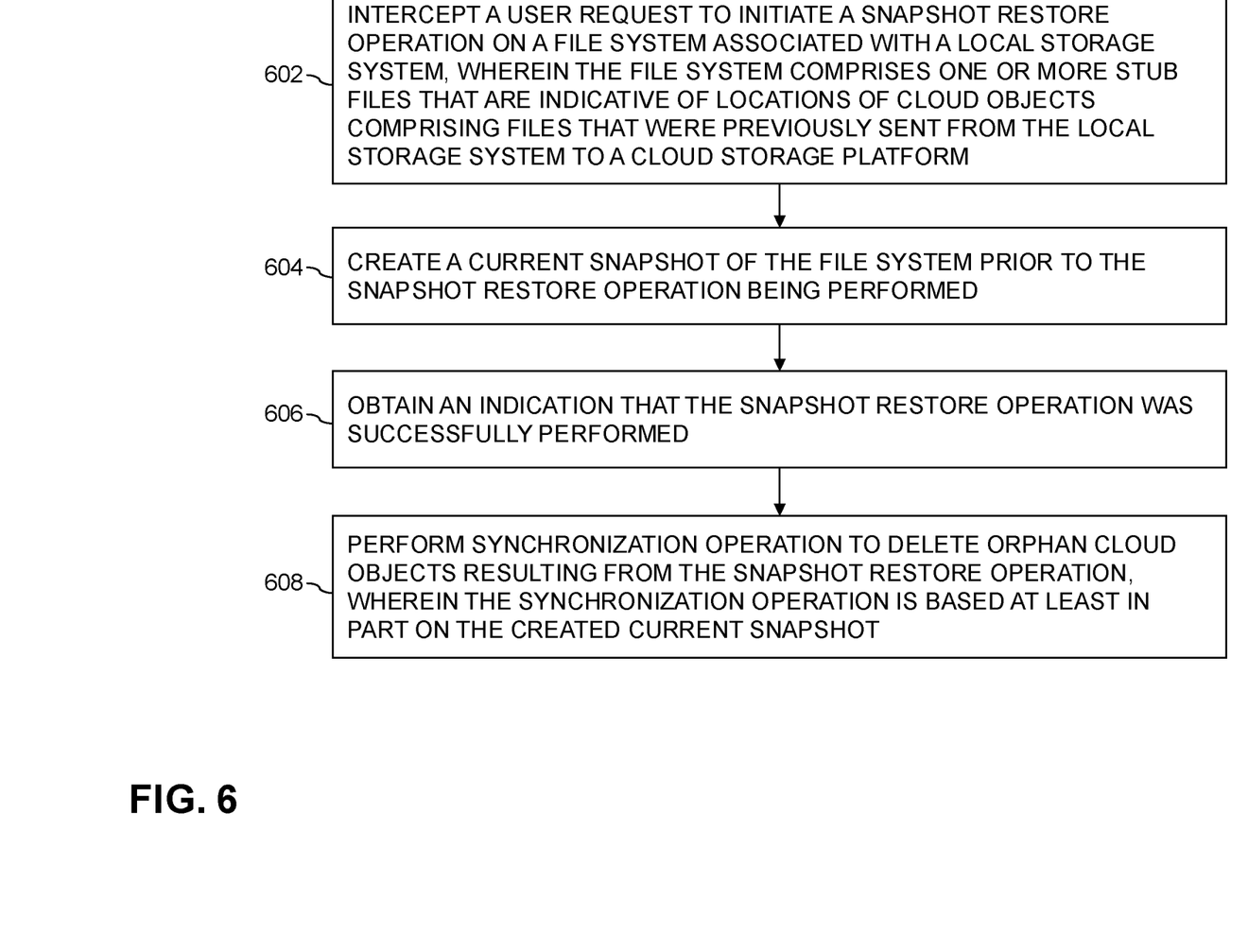
FIG. 6 shows an example of an orphan management process in an illustrative embodiment.

FIG. 6 shows an example of a process for efficient synchronization during a snapshot restore operation in illustrative embodiments. It is to be understood that this particular process is only an example, and additional or alternative processes can be carried out in other embodiments.

In this embodiment, the process includes steps 602 through 608. These steps are assumed to be performed by the first storage system 102 utilizing its elements 118 and 120.

Step 602 includes intercepting a user request to initiate a snapshot restore operation on a file system associated with a local storage system, wherein the file system comprises one or more stub files that are indicative of locations of cloud objects comprising files that were previously sent from the local storage system to a cloud storage platform. Step 604 includes creating a current snapshot of the file system prior to the snapshot restore operation being performed. Step 606 includes obtaining an indication that the file system was successfully restored on the local storage system. Step 608 includes using the current snapshot to perform a synchronization operation, wherein the synchronization operation deletes one or more orphan cloud objects in the cloud storage platform that resulted from the snapshot restore operation.

The process depicted in FIG. 6 may further include a step of deleting the current snapshot in response to completion of the synchronization operation. Also, the process depicted in FIG. 6 may include steps of deleting a given one of the stub files from the local storage platform in response to a user operation; and adding a record to a database of the local storage system that is indicative of the time the stub file was deleted. The synchronization operation may include: determining that a previous snapshot of the file system does not exist; and deleting the cloud objects from the cloud storage platform that correspond to the records in the database. The synchronization operation comprises: determining that one or more previous snapshots of the file system exist; and deleting a given one of the cloud objects from the cloud storage platform based on the current snapshot, the one or more previous snapshots, and the time the stub file corresponding to the given cloud object was deleted. The process depicted in FIG. 6 may further include a step of creating the one or more previous snapshots on the local storage system based on one or more user defined policies, wherein each of the one or more previous snapshots are associated with a respective creation time. The synchronization operation may include looping through each of the one or more previous snapshots of the file system based on the respective creation times to determine whether or not to delete the given cloud object. The looping at a given one of the previous snapshots may include one or more of: determining whether or not the time the stub file corresponding to the given cloud object was deleted occurred prior to the snapshot that was used to restore the file system; determining whether or not the time the stub file corresponding to the given cloud object was deleted occurred after the snapshot that was used to restore the file system; and determining whether or not the time the stub file corresponding to the given cloud object was deleted occurred within the time between the snapshot that was used to restore the file system and the snapshot having the latest creation time relative to the snapshot that was used to restore the file system and the snapshot. A given one of the stub files may include a pointer to an address of the corresponding cloud object within the cloud storage platform.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to account for orphan cloud objects that inefficiently consume cloud storage resources. These and other embodiments can effectively improve the efficiency of managing cloud storage resources.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for efficient synchronization of a cloud enabled file system database during a snapshot restore operation will now be described in greater detail with reference to FIGS. 7 and 8. Although described in the context of system 100, these platforms may also be used to implement at least portions of other information processing systems in other embodiments.

Figure 7:
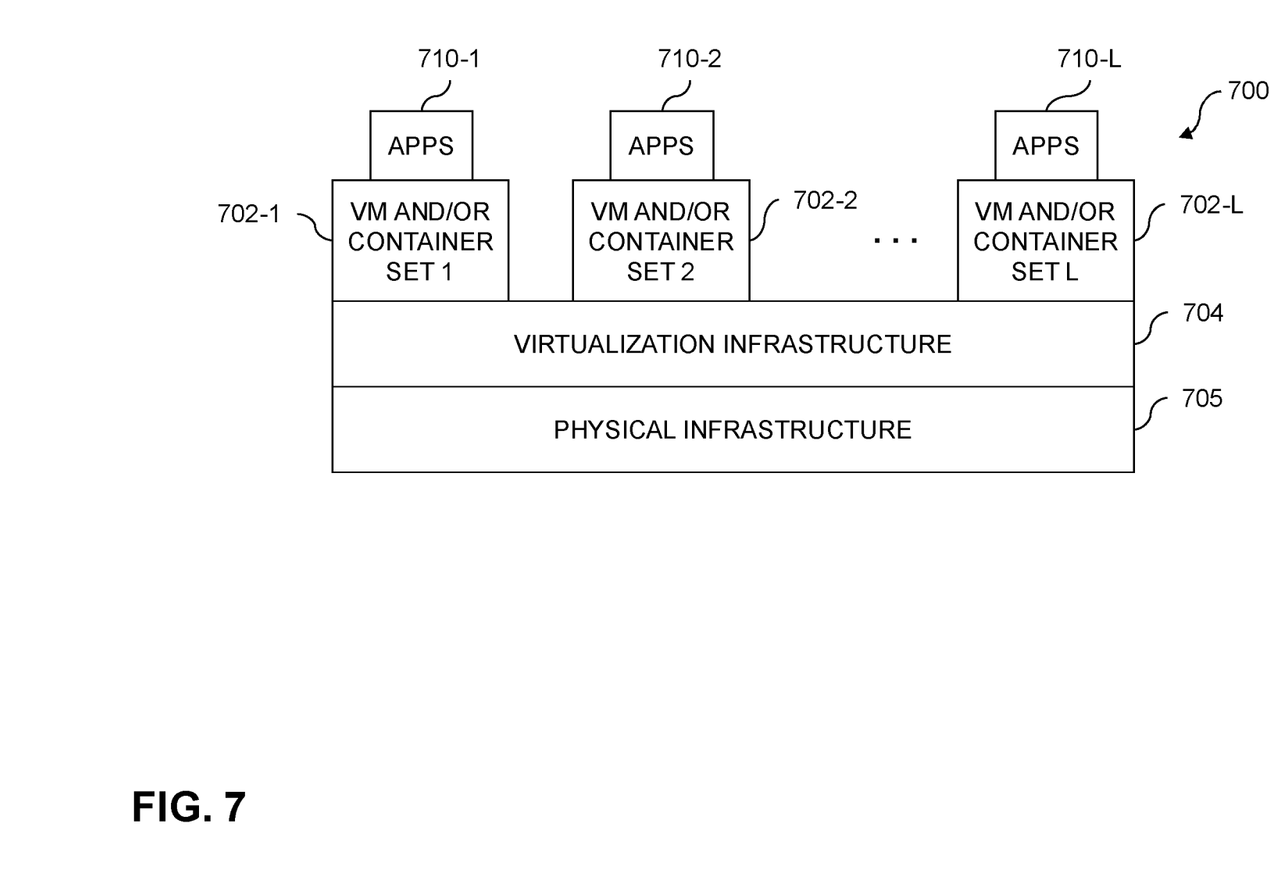
FIGS. 7 and 8 show examples of processing platforms that may be utilized to implement at least a portion of an information processing system in illustrative embodiments.
Figure 8:
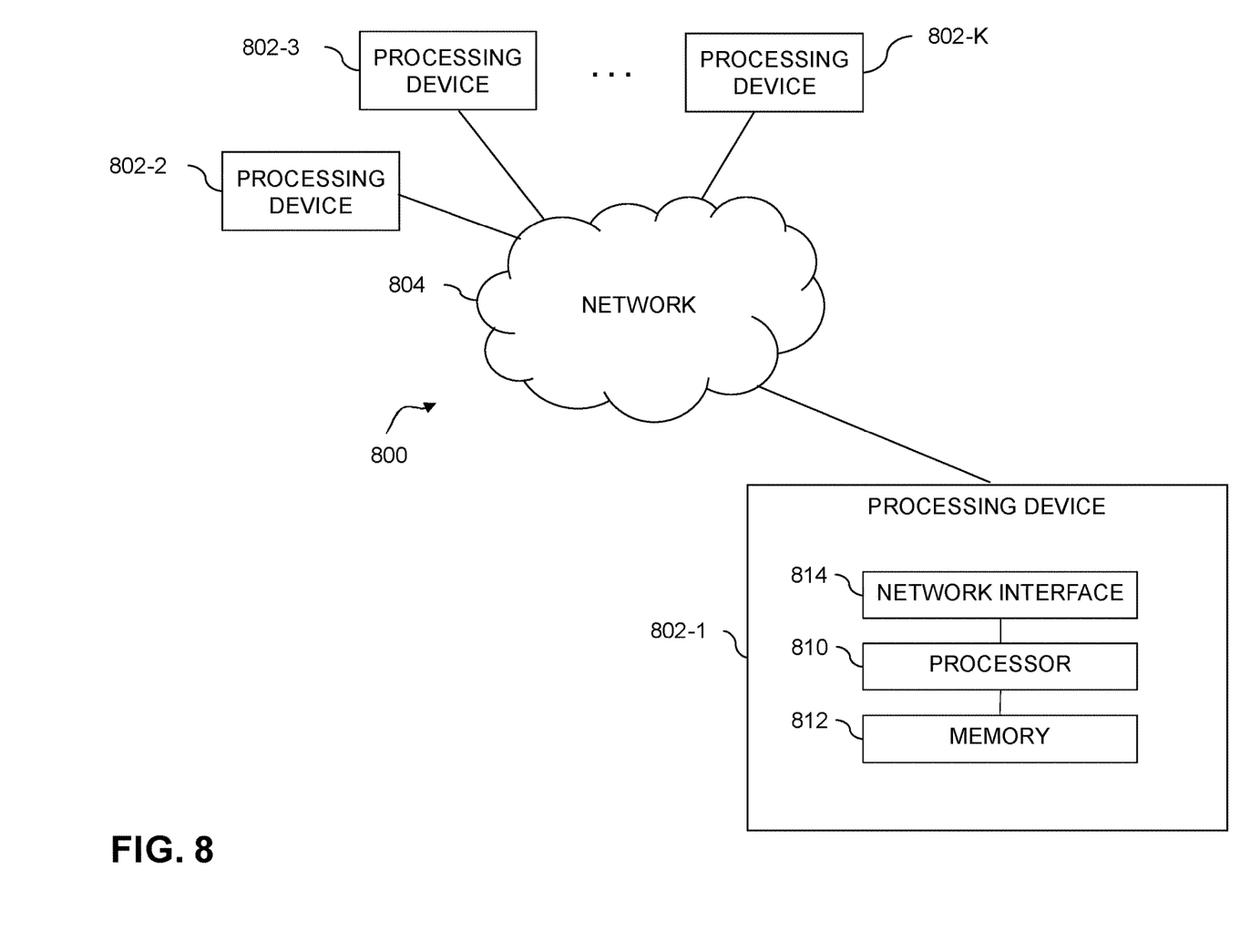

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide functionality for efficient synchronization during a snapshot restore operation of the type described above using one or more processes running on a given one of the VMs. For example, each of the VMs can implement mobility logic 118, snapshot logic 120 and/or other components for implementing functionality for efficient synchronization during a snapshot restore operation in the first storage system 102.

A hypervisor platform may be used to implement a hypervisor within the virtualization infrastructure 704. Such a hypervisor platform may comprise an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can also provide functionality for efficient synchronization during a snapshot restore operation in a storage system of the type described above. For example, a container host device supporting multiple containers of one or more container sets can implement one or more instances of the mobility logic 118, snapshot logic 120, and/or other components for implementing functionality for efficient synchronization during a snapshot restore operation in the first storage system 102.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for efficient synchronization of a cloud enabled file system database during a snapshot restore operation of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage devices, storage controllers, and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
intercepting a user request to initiate a snapshot restore operation on a file system of a local storage system, wherein the file system comprises one or more stub files that are indicative of locations of cloud objects comprising files that were previously sent from the local storage system to a cloud storage platform;
prior to the snapshot restore operation being performed, creating a current snapshot of the file system;
obtaining an indication that the file system was successfully restored on the local storage system; and
using the current snapshot to perform a synchronization operation, wherein the synchronization operation deletes one or more orphan cloud objects in the cloud storage platform that resulted from the snapshot restore operation, wherein the synchronization operation comprises: (i) looping through one or more previous snapshots of the file system based on respective creation times associated with the one or more previous snapshots of the file system, wherein the looping for a given one of the previous snapshots comprises determining whether or not the time the stub file corresponding to a given one of the cloud objects was deleted occurred within the time between the snapshot that was used to restore the file system and the snapshot having the latest creation time relative to the snapshot that was used to restore the file system and the snapshot; and (ii) deleting the given one of the cloud objects from the cloud storage platform based on a result of the looping;
wherein the method is performed by at least one processing device comprising a processor coupled to a memory.

2. The computer-implemented method of claim 1, further comprising:
deleting the current snapshot in response to completion of the synchronization operation.

3. The computer-implemented method of claim 1, further comprising:
adding a record to a database of the local storage system that is indicative of the time the stub file for the given one of the cloud objects from the cloud storage platform was deleted from the local storage system, wherein the stub file for the given one of the cloud objects from the cloud storage platform was deleted in response to a user operation.

4. The computer-implemented method of claim 3, wherein the synchronization operation comprises:
in response to determining that no previous snapshot of the file system exists, deleting the given one of the cloud objects from the cloud storage platform that corresponds to the record in the database.

5. The computer-implemented method of claim 3, wherein the looping is performed in response to determining that one or more previous snapshots of the file system exist, and wherein the given one of the cloud objects is deleted from the cloud storage platform based on the current snapshot, the one or more previous snapshots, and the time the stub file corresponding to the given one of the cloud objects was deleted.

6. The computer-implemented method of claim 5, comprising:
creating the one or more previous snapshots on the local storage system based on one or more user defined policies.

7. The computer-implemented method of claim 1, wherein the looping at the given one of the previous snapshots comprises one or more of:
determining whether or not the time the stub file corresponding to the given one of the cloud objects was deleted occurred after the snapshot that was used to restore the file system; and
determining whether or not the stub file for a given one of the cloud objects from the cloud storage platform was deleted prior to the snapshot that was used to restore the file system.

8. The computer-implemented method of claim 1, wherein a given one of the stub files comprises a pointer to an address of the corresponding cloud object within the cloud storage platform.

9. A non-transitory processor-readable storage medium having stored therein program code of one or more software programs, wherein the program code when executed by at least one processing device causes the at least one processing device:
to intercept a user request to initiate a snapshot restore operation on a file system of a local storage system, wherein the file system comprises one or more stub files that are indicative of locations of cloud objects comprising files that were previously sent from the local storage system to a cloud storage platform;
prior to the snapshot restore operation being performed, to create a current snapshot of the file system;
to obtain an indication that the file system was successfully restored on the local storage system; and
to use the current snapshot to perform a synchronization operation, wherein the synchronization operation deletes one or more orphan cloud objects in the cloud storage platform that resulted from the snapshot restore operation, wherein the synchronization operation comprises: (i) looping through one or more previous snapshots of the file system based on respective creation times associated with the one or more previous snapshots of the file system, wherein the looping for a given one of the previous snapshots comprises determining whether or not the time the stub file corresponding to a given one of the cloud objects was deleted occurred within the time between the snapshot that was used to restore the file system and the snapshot having the latest creation time relative to the snapshot that was used to restore the file system and the snapshot; and (ii) deleting the given one of the cloud objects from the cloud storage platform based on a result of the looping.

10. The non-transitory processor-readable storage medium of claim 9, wherein the at least one processing device is further caused:
to delete the current snapshot in response to completion of the synchronization operation.

11. The non-transitory processor-readable storage medium of claim 9, wherein the at least one processing device is further caused:
to add a record to a database of the local storage system that is indicative of the time the stub file for the given one of the cloud objects from the cloud storage platform was deleted from the local storage system, wherein the stub file for the given one of the cloud objects from the cloud storage platform was deleted in response to a user operation.

12. The non-transitory processor-readable storage medium of claim 11, wherein the synchronization operation comprises:
in response to determining that no previous snapshot of the file system exists, deleting the given one of the cloud objects from the cloud storage platform that corresponds to the record in the database.

13. The non-transitory processor-readable storage medium of claim 11, wherein the looping is performed in response to determining that one or more previous snapshots of the file system exist, and wherein the given one of the cloud objects is deleted from the cloud storage platform based on the current snapshot, the one or more previous snapshots, and the time the stub file corresponding to the given one of the cloud objects was deleted.

14. The non-transitory processor-readable storage medium of claim 13, wherein the at least one processing device is further caused:
to create the one or more previous snapshots on the local storage system based on one or more user defined policies.

15. The non-transitory processor-readable storage medium of claim 9, wherein the looping at the given one of the previous snapshots comprises one or more of:
determining whether or not the time the stub file corresponding to the given one of the cloud objects was deleted occurred after the snapshot that was used to restore the file system; and
determining whether or not the stub file for a given one of the cloud objects from the cloud storage platform was deleted prior to the snapshot that was used to restore the file system.

16. The non-transitory processor-readable storage medium of claim 9, wherein a given one of the stub files comprises a pointer to an address of the corresponding cloud object within the cloud storage platform.

17. An apparatus comprising:
at least one memory storing computer program code;
at least one processor coupled to the at least one memory, the at least one memory and the at least one processor being configured to cause the apparatus:
to intercept a user request to initiate a snapshot restore operation on a file system of a local storage system, wherein the file system comprises one or more stub files that are indicative of locations of cloud objects comprising files that were previously sent from the local storage system to a cloud storage platform;
prior to the snapshot restore operation being performed, to create a current snapshot of the file system;
to obtain an indication that the file system was successfully restored on the local storage system; and
to use the current snapshot to perform a synchronization operation, wherein the synchronization operation deletes one or more orphan cloud objects in the cloud storage platform that resulted from the snapshot restore operation, wherein the synchronization operation comprises: (i) looping through one or more previous snapshots of the file system based on respective creation times associated with the one or more previous snapshots of the file system, wherein the looping for a given one of the previous snapshots comprises determining whether or not the time the stub file corresponding to a given one of the cloud objects was deleted occurred within the time between the snapshot that was used to restore the file system and the snapshot having the latest creation time relative to the snapshot that was used to restore the file system and the snapshot; and (ii) deleting the given one of the cloud objects from the cloud storage platform based on a result of the looping.

18. The apparatus of claim 17, wherein the at least one memory and the at least one processor being further configured to cause the apparatus:
to delete the current snapshot in response to completion of the synchronization operation.

19. The apparatus of claim 17, wherein the at least one memory and the at least one processor being further configured to cause the apparatus:
to add a record to a database of the local storage system that is indicative of the time the stub file for the given one of the cloud objects from the cloud storage platform was deleted from the local storage system, wherein the stub file for the given one of the cloud objects from the cloud storage platform was deleted in response to a user operation.

20. The apparatus of claim 19, wherein the synchronization operation comprises:
in response to determining that no previous snapshot of the file system exists, deleting the given one of the cloud objects from the cloud storage platform that corresponds to the record in the database.

* * * * *